(12) United States Patent
Garrido Escudero

(10) Patent No.: US 11,383,976 B2
(45) Date of Patent: Jul. 12, 2022

(54) SYSTEM AND PROCESS FOR GENERATING HYDROGEN

(71) Applicant: Drage & Mate International S.L., Guadalupe (ES)

(72) Inventor: Amalio Garrido Escudero, Guadalupe (ES)

(73) Assignee: Drage & Mate International S.L., Guadalupe (ES)

( * ) Notice: Subject to any disclaimer, the term of this patent is extended or adjusted under 35 U.S.C. 154(b) by 0 days.

(21) Appl. No.: 15/575,776

(22) PCT Filed: May 19, 2016

(86) PCT No.: PCT/ES2016/070377
§ 371 (c)(1),
(2) Date: Nov. 20, 2017

(87) PCT Pub. No.: WO2016/185075
PCT Pub. Date: Nov. 24, 2016

(65) Prior Publication Data
US 2018/0297841 A1 Oct. 18, 2018

(30) Foreign Application Priority Data

May 20, 2015 (EP) ..................................... 15382262

(51) Int. Cl.
*C01B 3/08* (2006.01)
*C01B 3/06* (2006.01)
*B01J 7/02* (2006.01)

(52) U.S. Cl.
CPC ..................... *C01B 3/08* (2013.01); *B01J 7/02* (2013.01); *C01B 3/06* (2013.01); *C01B 3/065* (2013.01); *C01B 3/068* (2013.01); *Y02E 60/36* (2013.01)

(58) Field of Classification Search
CPC ....................................................... C01B 3/08
(Continued)

(56) References Cited

U.S. PATENT DOCUMENTS

| 3,911,284 A | * | 10/1975 | Skala ...................... F02B 75/04 |
| | | | 180/65.1 |
| 2005/0042165 A1 | * | 2/2005 | Akiyama .............. C01B 3/0005 |
| | | | 423/648.1 |

(Continued)

FOREIGN PATENT DOCUMENTS

| EP | 1845572 A1 | 10/2007 |
| EP | 2394953 B1 | 8/2012 |

(Continued)

OTHER PUBLICATIONS

International Search Report for Application No. PCT/ES2016/070377 dated Jul. 21, 2016.

(Continued)

*Primary Examiner* — Douglas B Call
(74) *Attorney, Agent, or Firm* — Knobbe Martens Olson & Bear, LLP

(57) ABSTRACT

A system is capable to safely generate a continuous controlled hydrogen flow. The passive auto sufficient hydrogen system is very valuable for example for emergency power back up, propulsion application, battery charging or powering portable devices. Also, a chemical process generates hydrogen using alkali metals, alkaline earth metals, hydrides of alkali metals or hydrides of alkaline earth metals to obtain primary by products from water. Then, the primary byproducts react with a metal reactant to obtain additional hydrogen.

8 Claims, 1 Drawing Sheet

(58) Field of Classification Search
USPC .......................................................... 423/658
See application file for complete search history.

(56) References Cited

U.S. PATENT DOCUMENTS

| | | | |
|---|---|---|---|
| 2007/0237995 A1* | 10/2007 | Eickhoff | .................. C01B 3/065 |
| | | | 429/421 |
| 2010/0247426 A1 | 9/2010 | Wallace et al. | |
| 2010/0316917 A1 | 12/2010 | Lefenfeld et al. | |
| 2014/0363370 A1 | 12/2014 | Ishikawa | |
| 2015/0111120 A1 | 4/2015 | Eickhoff | |
| 2016/0068971 A1* | 3/2016 | Phillips | ..................... C01B 3/08 |
| | | | 205/637 |

FOREIGN PATENT DOCUMENTS

| WO | WO 2010/076802 A1 | | 7/2010 |
|---|---|---|---|
| WO | WO2014176459 | * | 2/2014 |

OTHER PUBLICATIONS

Written Opinion for Application No. PCT/ES2016/070377 dated Jul. 21, 2016.

* cited by examiner

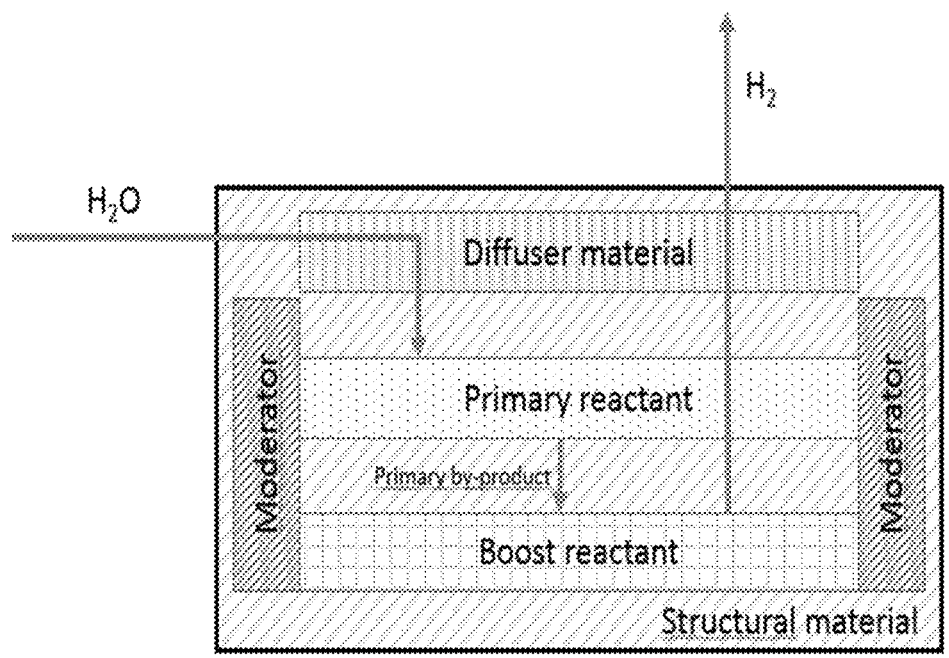

SYSTEM AND PROCESS FOR GENERATING HYDROGEN

This application is the U.S. National Phase under 35 U.S.C. § 371 of International Application No. PCT/ES2016/070377, filed May 19, 2016, designating the U.S., and published in Spanish as WO 2016/0185075 A1 on Nov. 24, 2016, which claims priority to Spanish Application No. 15382262.2, filed May 20, 2015, the entire contents of which are incorporated herein by reference.

The present invention relates to a system and a process for generating hydrogen.

The system of the invention is capable to safely generate a continuous controlled hydrogen flow. The passive auto sufficient hydrogen system of the invention is very valuable for example for emergency power back up, propulsion application, battery charging or powering portable devices.

Also, the present invention refers to a chemical process for generating hydrogen using alkali metals, alkaline earth metals, hydrides of alkali metals or hydrides of alkaline earth metals to obtain primary by products from water. Then the primary by products reacts with a metal reactant to obtain additional hydrogen.

BACKGROUND ART

Among various alternatives, hydrogen fuel offers the highest potential benefits in terms of reduced emissions of polutants and greenhouse, but to date there is still a lack of efficiency in its production.

A passive system can be based on different chemical process. Chemical water splitting processes are one of the option for this kind of hydrogen generation processes. Recently some advances have been made in this field using alkali and alkaline earth metal and alloys in liquid state as is described in EP2394953.

The EP2394953 describes a reaction between a liquefied alkali metal, alkaline earth metal, or an alloy of any such metals and water, as well as an improved way of recycling such metals or alloys after hydrogen generation.

The patent application US20140363370 describes a method for generating hydrogen from water, from alkali metal hydroxide and a metal which comprises the steps of accommodating an alkali metal hydroxide and a metal element supply body in a sealable case so as to form a reaction space above the alkali metal hydroxide; heating to a temperature above the melting point of the alkali metal hydroxide to make a molten salt, ejecting a large number of particles including metal and supplying steam. In this patent application it is necessary to heat at a temperature very high until the melting point of the alkali metal hydroxide therefore it a very costly process.

Finally the patent application WO2010076802 relates to increase reactivity of aluminum with water to obtain hydrogen. The applicants of this invention reveal that aluminium may be activated by treating it with small quantities of lithium or lithium hydride, apparently forming an aluminum lithium solid solution. The activated aluminium-based composition can then react spontaneously with water even at room temperature and at neutral or close to neutral pH without adding any chemicals to the water.

Many attempts have been performed in order to increase hydrogen production, but all of them present limited industrial applications.

Thus, from what is known in the art, it is derived that the development of a process for the production of hydrogen is still of great interest.

SUMMARY OF THE INVENTION

Inventors have found a system and a process for generating hydrogen that provides a low cost hydrogen generation, with a high purity and at a high efficiency, by spontaneous reaction with water.

The system of the invention is capable to safely generate a continuous controlled hydrogen flow. The system comprises: a structural material to support a primary reactant and a boost reactant; a moderator material and a diffuser material.

The structural material is required for different purposes. First function is to allow primary reactant to be distributed in a way that shows a specific contact interface with water. Second functionality is to ensure proper contact from the different reactants. Third function is to provide protection, form and shape to be handle safely during transportation and use. And fourth function is to transfer heat from reaction surface to the moderator material.

The structural material can be design according weight, volume and robustness specifications. The structure can be layered, shell type, framed, particle bed, tubular, mass structure, honeycomb, sandwich type, trabecular or any other required by use.

The reaction of the process of the invention are strongly exothermic. Therefore the moderator make possible the process because it is a material able to reduce impact from primary and secondary reactions and by-products. The "moderator material" as used herein, is defined as a material which slows the speed of the process.

The moderator can reduce the primary reaction rate by remove heat to the structural material or displace primary and secondary reaction in opposite way according Law of Mass Action of every reaction.

The diffuser material is a material able to transport water in a controlled way to ensure proper contact with primary reactant surface and permeate hydrogen from reaction surface to ensure required hydrogen purity.

Therefore, the first aspect of the invention is:

A system for generating hydrogen from water comprising:
(a) a structural material to support:
a primary reactant in solid state selected from: alkali metals, alkaline-earth metals, alkali-alkaline earth metal alloys, hydrides of alkali metals or hydrides of alkaline-earth metals and;
a boost reactant in solid state selected from: silicon, tin, iron, zinc, manganese, aluminium, iron, berylium, magnesium or alloy between them;
(b) a moderator material which is in contact with the structural material
(c) a diffuser material wherein the water is diffused before reacting with the primary reactant and wherein the hydrogen obtained is permeated.

Another aspect of the invention is a process that is passive and auto sufficient. The process of the invention starts with the reaction of liquid water with the primary reactant to obtain hydrogen and to generate primary by products. In a second step the primary by products reacts with a boost reactant selected from metal to obtain additional hydrogen gas generation and generate a secondary by products.

Therefore, the second aspect of the invention relates to a process for generating hydrogen from water in a chain reaction which comprises the steps of:

(a) reacting liquid water at room temperature with primary reactant in solid state selected from: alkali metals, alkaline-earth metals, alkali-alkaline earth metal alloys, hydrides of alkali metals or hydrides of alkaline earth metals in solid state, to obtain the corresponding hydroxide as primary by products;

(b) reacting the hydroxide obtained in the step a) with water and with boost reactant in solid state selected from: silicon, tin, iron zinc, manganese, aluminium, iron, berylium, magnesium or alloy between them in solid state to obtain additional hydrogen and an oxide as secondary by products;

(c) separating hydrogen from residual reaction product (d) collecting the hydrogen.

BRIEF DESCRIPTION OF THE DRAWINGS

FIG. 1 shows a flow diagram of the system of the invention.

DETAILED DESCRIPTION OF THE INVENTION

As mentioned above, another aspect of the present invention relates to a system for generating hydrogen from water comprising:

(a) a structural material to support:

a primary reactant in solid state selected from: alkali metals, alkaline-earth metals, alkali-alkaline earth metal alloys, hydrides of alkali metals or hydrides of alkaline earth metals and;

a boost reactant in solid state selected from: silicon, tin, iron, zinc, manganese, aluminium, iron, berylium, magnesium or alloy between them;

(b) a moderator material which is in contact with the structural material (c) a diffuser material wherein the water is diffused before reacting with the primary reactant and wherein the hydrogen obtained is permeated.

In a preferred embodiment the structural material is selected from inorganic solid metal, oxide, salt, graphite, sulphur and steel. Alkali metal hydroxides and alkaline earth metal hydroxides are known to be strongly corrosive. Therefore, in a particular embodiment the structural material is steel.

In a preferred embodiment the moderator material is selected from a phase change material (PCM) like salt hydrates, metals, salts, eutectics compound or any material able to release primary or secondary by-products when temperature increase like nanostructured materials, inorganic sorbent material, zeolites and so on. In a preferred embodiment the moderator is barium salts.

Diffuser material can be any porous material with diffusion properties like synthetized steels, metal membranes between others. Diffuser material is inert or compatible with reactants, by-products, water and hydrogen.

As mentioned above, an aspect of the present invention relates to a process for generating hydrogen from water in a chain reaction which comprises the steps of:

(a) reacting water with primary reactant selected from: alkali metals, alkaline-earth metals, alkali-alkaline earth metal alloys, hydrides of alkali metals or hydrides of alkaline earth metals in solid state, to obtain the corresponding hydroxide as primary by products;

(b) reacting the hydroxide obtained in the step a) with water and with a metal selected from: silicon, tin, zinc, manganese, aluminium, iron, berylium, magnesium or alloy between them in solid state to obtain additional hydrogen and an oxide as secondary by products;

(c) separating hydrogen from residual reaction product (d) collecting the hydrogen.

In a preferred embodiment the alkali and alkaline earth metal is selected from: Li, Na, K and Mg, preferred suitable metal reagents are Na and Li, and a particularly preferred is Na due that has a relatively low melting point and is abundant. An especially interesting alloy is 5/95 Li/Na alloy which has an energetic intensity that is higher than that of Na alone and a melting point (=89° C.) that is 10° C. lower than that of Na, Other useful alloys comprise, for example, potassium and sodium such as 56/44 Na/K alloy the melts at 6.8° C., or lithium and strontium such as 12/88 Li/Sr alloy that melts at 132° C.

The efficiency of the process of the invention is at least of 90%.

Example

The example is prepared as follows:

Reactants and Material reactants: sodium metal; ferrosilicon; structural material: steel foil moderator: $CuSO_4+BaCl_2+NH_4Cl$; mesh: Steel SS304 mesh The reactions developments were the following:

$$Na+H_2O \rightarrow NaOH + \tfrac{1}{2}H_2 \qquad 1.$$

$$3Fe+4H_2O \rightarrow Fe_3O_4+4H_2$$

$$2NaOH+Si+H_2O \rightarrow Na_2SiO_3+2H_2 \qquad 2.$$

Reaction of the Phase Change Material $$BaCl_2+NaOH \rightarrow Ba(OH)_2+NaCl \text{ (it is removing hydroxides from reaction media)}$$

$$Ba(OH)_2.8H_2O(s)+2NH_4Cl(s) \rightarrow 2NH_3(g)+10H_2O(l)+BaCl_2(s) \text{ (very endothermic)}$$

$$CuSO_4+4NH_3+H_2O \rightarrow [Cu(NH_3)_4]SO_4 \cdot H_2O \text{ (secuestrating } NH_3)$$

the total weight of the different elements were the following:

50 g Na metal
50 g Si metal
200 g Fe metal
75 g $BaCl_2$
35 g $NH_4Cl$
210 g $CuSO_4$
Steel foil: 90 g
Steel SS304 mesh: 14 g
TOTAL WEIGTH: 724 g
Hydrogen generated (weight): 13 g $H_2$
Hydrogen generated (volume): 145.6 SL
Energy stored: 433.33 Wh
Gravimetric energy density: 724 Wh/Kg
Minimum water needed for reaction: 125 g

What is claimed is:

1. A system for generating hydrogen from water comprising:

(a) a structural material to support:

a primary reactant in a solid state selected from the group consisting of alkali metals, alkaline-earth metals, alkali-alkaline earth metal alloys, hydrides of alkali metals, and hydrides of alkaline earth metals, and;

a boost reactant in a solid state selected from the group consisting of tin, iron, zinc, manganese, aluminum, beryllium, magnesium or alloy between them;

(b) a moderator material which is in contact with the structural material, wherein the moderator material is a phase-change material (PCM) selected from the group consisting of salt hydrates, metals, salts, and eutectic mixtures, or a material able to release primary or secondary by-products when temperature is increased selected from the group consisting of nanostructured materials, and zeolites; and (c) a diffuser material wherein the system is configured such that water is diffused before reacting with the primary reactant and such that the hydrogen obtained is permeated.

2. A process for generating hydrogen from water in a chain reaction, comprising:

(a) reacting liquid water at room temperature with a primary reactant in a solid state selected from the group consisting of alkali metals, alkaline-earth metals, alkali-alkaline earth metal alloys, hydrides of alkali metals, and hydrides of alkaline earth metals in solid state, to obtain the corresponding hydroxide as primary by products in presence of a phase-change material (PCM) selected from the group consisting of salt hydrates, metals, salts, and eutectic mixtures, or a material able to release primary or secondary by-products when temperature is increased selected from the group consisting of nanostructured materials, and zeolites;

(b) reacting the hydroxide obtained in said a) with water and with a boost reactant in a solid state selected from the group consisting of tin, iron, zinc, manganese, aluminum, berylium, magnesium or alloy between them in solid state to obtain additional hydrogen and an oxide as secondary by-products;

(c) separating hydrogen from residual reaction product; and (d) collecting the hydrogen.

3. The system for generating hydrogen from water according to claim 1, wherein the moderator material comprises barium salts.

4. A process for generating hydrogen from water in a chain reaction, comprising (a) reacting liquid water at room temperature with a primary reactant in a solid state selected from the group consisting of alkali metals, alkaline-earth metals, alkali-alkaline earth metal alloys, hydrides of alkali metals, and hydrides of alkaline earth metals in solid state, to obtain the corresponding hydroxide as primary by products in presence of a phase-change material (PCM) selected from the group consisting of salt hydrates, metals, salts, and eutectic mixtures, or a material able to release primary or secondary by-products when temperature is increased selected from the group consisting of nanostructured materials, and zeolites;

(b) reacting the hydroxide obtained in said a) with water and with a boost reactant in a solid state selected from the group consisting of silicon, tin, iron, zinc, manganese, aluminum, berylium, magnesium or alloy between them in solid state to obtain additional hydrogen and an oxide as secondary by-products;

(c) separating hydrogen from residual reaction product; and (d) collecting the hydrogen, wherein the moderator material comprises barium salts.

5. The system of claim 1, wherein the primary reactant further comprises a potassium/sodium alloy.

6. The system of claim 1, wherein the primary reactant further comprises a 5/95 Li/Na alloy.

7. The process for generating hydrogen from water in a chain reaction according to claim 2, wherein the primary reactant further comprises, a potassium/sodium alloy.

8. The process for generating hydrogen from water in a chain reaction according to claim 2, wherein the primary reactant further comprises a 5/95 Li/Na alloy.

* * * * *